June 10, 1930.                    A. W. BROHMAN                    1,763,088
                                VEHICLE CONSTRUCTION
                               Filed Dec. 8, 1926          2 Sheets-Sheet 1

INVENTOR
Alexander W. Brohman
BY
*his* ATTORNEYS

June 10, 1930.  A. W. BROHMAN  1,763,088
VEHICLE CONSTRUCTION
Filed Dec. 8, 1926   2 Sheets-Sheet 2
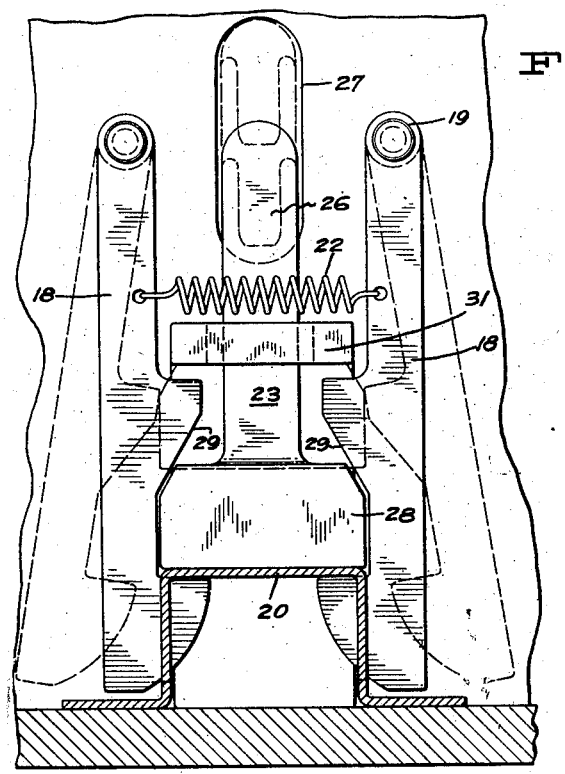
FIG. 3.
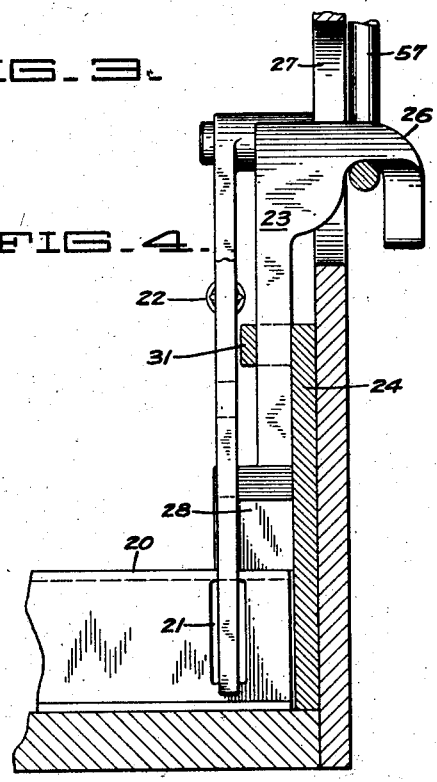
FIG. 4.
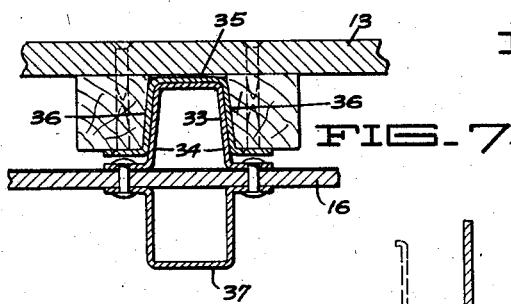
FIG. 7.
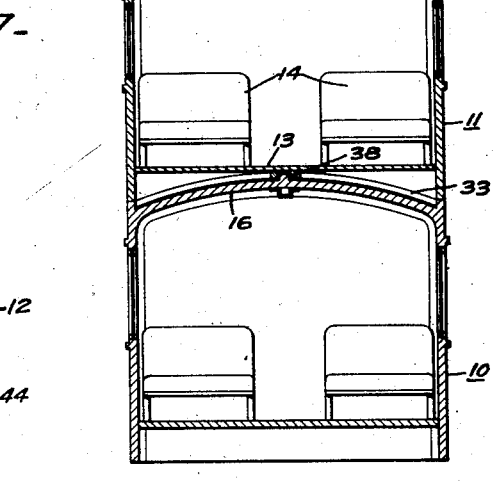
FIG. 5.
FIG. 6.
INVENTOR
Alexander W. Brohman
BY White & Prest
his ATTORNEYS Patented June 10, 1930

1,763,088

UNITED STATES PATENT OFFICE

ALEXANDER W. BROHMAN, OF SAN FRANCISCO, CALIFORNIA

VEHICLE CONSTRUCTION

Application filed December 8, 1926. Serial No. 153,288.

This invention relates generally to body constructions for self or motor propelled passenger vehicles.

Common carriers of passengers must contend with a varying load of traffic through the course of the day, especially in the larger cities. The peak loads may either be met by providing vehicles sufficiently commodious for the increased traffic or extra vehicles may be operated during this time. Both methods are uneconomical and unsatisfactory as presently practiced. The large bodies necessary for the former method are expensive and needlessly consume power while the traffic is light and if extra vehicles are utilized a large proportion of the equipment remains idle most of the time. The result of these methods is to greatly increase the operating overhead of transportation companies, which increase is reflected in higher fare paid by the passengers.

It is an object of this invention to devise a motor vehicle body having a removable portion which may be utilized to carry an additional number of passengers.

It is further object of this invention to devise a motor vehicle body having the usual lower portion for passengers and an upper portion removably secured to the lower portion.

It is another object of this invention to devise a novel form of locking mechanism for securing an upper deck to a lower deck of a motor vehicle.

It is a further object of this invention to devise means for automatically opening a stairway between the lower and upper decks of a bus when the upper deck is positioned upon the lower.

It is another object of this invention to devise a novel hoisting means for removing an upper deck from a motor vehicle.

Further objects of this invention will appear from the following description in which I have set forth the preferred embodiment of my invention. It is to be understood that the invention is capable of a number of embodiments within the range of mechanical equivalents consistent with the state of the prior art.

Referring to the drawings:

Fig. 3 is a detail view showing the locking means for locking together the upper and lower portions of the vehicle body.

Fig. 4 is a side view of the mechanism shown in Fig. 3, certain portions being shown in cross section.

Fig. 5 is a transverse cross sectional view taken through the vehicle body shown in Fig. 2.

Fig. 6 is a cross sectional view showing the trap door and its operating mechanism.

Fig. 7 is a cross sectional detail illustrating the means for preventing relative shifting movement between the upper and lower decks.

Figure 1:
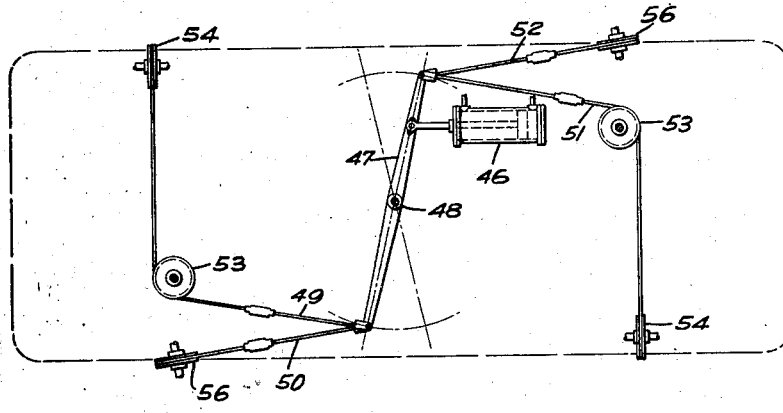
Figure 1 is a plan view of the hoisting mechanism for lifting the upper deck from the lower.

The invention comprises generally a motor or self propelled vehicle having an ordinary lower portion for passengers, and in addition an upper portion which may be detached from the lower portion. Suitable locking means is provided for rigidly securing the upper and lower portions together and interfitting parts are utilized for preventing both fore and aft and lateral shifting of the upper portion with respect to the lower. The vehicle is intended to be used in conjunction with a suitable hoisting mechanism for removing the upper portion when the lower portion alone is sufficient to meet traffic conditions. The locking means consists of a plurality of locking devices designed so that when the hoisting mechanism is attached thereto, the upper and lower portions are first unlocked and then the upper portion is lifted clear of the lower. When it is desired to accommodate a greater number of passengers than can be seated in the lower portion, as during peak load conditions, it is simply necessary to lower an upper portion upon the top of the lower as the locking devices are automatically engaged. For controlling the stairway between the two portions, there is provided a trap door which automatically opens as the upper portion is placed in position upon the lower.

Thus referring to the drawings there is shown a motor bus having a lower body portion 10 of the inclosed type and an upper body portion 11 which may be removably secured to the top of the lower portion. The upper portion may consist merely of a deck having a railing without a covering or may be an enclosure for seats secured to the top of the lower portion. It is preferably however a complete upper deck and includes an inclosure 12 and floor 13 upon which are supported suitable seats 14. The top 16 of the lower portion 10 is preferably constructed so that the lower portion will give the appearance of an ordinary single deck bus when the upper portion has been removed. The locking means for securing the two portions together preferably utilizes a plurality of locking devices, each comprising a pair of latches 18 pivotally mounted as at 19 to the sides of the upper body portion. Secured to the lower body portion there is a keeper 20 provided with openings or slots 21 to permit the same to be engaged by the latches. The latches are normally urged to engaging position by suitable means such as a tension spring 22.

Figure 2:
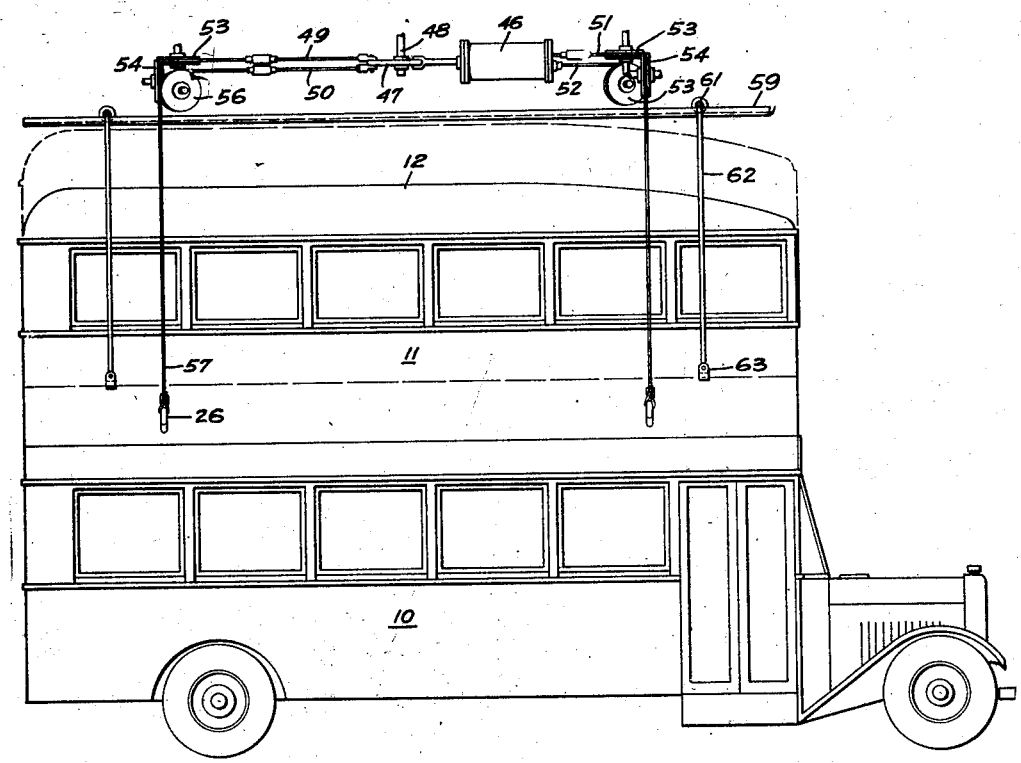
Fig. 2 is a side elevational view of a vehicle incorporating the principles of this invention, a hoisting mechanism being shown for lifting the upper portion from the lower.

For disengaging the latches 18 there is provided a pull bar 23 slidably mounted upon the upper body portion by means of a bracket 24, this bar having a portion 26 extending through an opening 27 in the side of the upper body portion for engaging a hoisting cable. Secured to this bar there is a block 28 adapted to engage the cam faces 29 upon the latches 18. When the bar 23 is moved upwardly as by means of any suitable hoisting mechanism, block 28 contacts with cam faces 29 to spread or force the latches 18 apart and out of engagement with the keeper 20. Continued upward movement of the bar 23 brings the block 28 into contact with a shoulder 31 which is fixed with respect to the bracket 24 and therefore with respect to the upper body portion. The bar 23 may therefore be used not only for unlocking the upper and lower body portions but also serves as a means for lifting the upper portion from the lower after disengagement of the locking means. On the other hand, when the upper body portion is lowered in its normal position by hoisting means connected to the bar 23, the latches will ride over the keeper 20 and automatically lock in position in the slots 21. In practice any number of these locking devices may be employed depending upon the size of the vehicle body. In Figs. 1 and 2 I have shown four of these devices, two being upon each side of the body.

The interfitting means between the upper and lower portions for preventing fore and aft shifting of the upper portion, preferably consists of a number of ribs upon the top of the lower portion adapted to interfit into complementary members provided upon the bottom of the upper portion. For example, there is shown a number of transverse ribs 33 and securely fixed to the top 16 of the lower portion. One suitable construction for these ribs is shown in Fig. 7 in which they are constructed of pressed metal and provided with tapered sides 34. Upon the bottom of the upper deck are the complementary members 35 having tapered sides 36 adapted to fit over the sides 34 of the ribs 33. These transverse ribs are preferably spaced apart and positioned over the transverse car lines 37 of the lower body portion. To prevent lateral shifting of the upper portion as well as shifting fore and aft there is provided a longitudinal rib 38 similar in all respects to the ribs 33 and adapted to engage a complementary member upon the upper portion similar to the rib 35 previously described. The function of the tapered sides 34 for the ribs is not only for securing a tighter fit between the ribs and the complementary members 35 but also for guiding members 35 over the ribs when the upper portion is being lowered in position.

For permitting access to the upper deck there is provided a stairway leading through the top 16 and the floor 13 of the upper portion. When the upper portion is removed a door is provided for closing this passageway. One suitable form of door having an automatic actuating mechanism is shown in Fig. 6 in which the stairway is indicated at 39. The door 40 is pivotally mounted as at 41 so as to be movable to an out of the way position while the upper portion is in use, and movable to closed position when the upper portion is removed. For automatic opening and closing of this door there is shown a plate 42 pivotally secured to the upper body portion, this plate being adapted to engage an extended portion 43 of the door 40. A socket 44 is provided upon this extension so that when the upper portion is lowered into position plate 42 will be seated in this socket and further lowering of the upper portion to its operative position will swing the door 40 upwardly to an out of the way position. When the upper portion is removed the door 40 is again permitted to drop to closed position. This door may be provided with a depending flange 45 adapted to fit into a groove 25 for drainage purposes.

While a variety of hoisting mechanisms may be employed for separating the upper and lower portions, the particular embodiment shown in Figs. 1 and 2 is believed to have several novel features. This mechanism includes a pneumatic cylinder and piston 46 adapted to actuate a lever 47 which is fulcrumed as at 48. One end of lever 47 is connected with cables 49 and 50 while the other end is connected with similar cables 51 and 52. Pulleys or sheaves 53 and 54 are provided for guiding cables 49 and 51 while sheaves 56 are employed for guiding cables 50 and 52. These cable terminals are provided with hooks 57 or other suitable engaging devices for connection with projecting portions 26 of the pull bars 23.

In removing an upper body portion the vehicle is moved beneath the hoisting mechanism, or the hoisting mechanism shifted to a position over the vehicle and the hooks 57 are engaged with the bars 23. The cylinder and piston 46 is then actuated by pneumatic pressure to rotate lever 47 and shift the hoisting cables, this operation serving to first unlock latches 18 and then lift the upper body portion clear of the lower. As it is usually desirable to move the upper body portion to a different locality so that the hoisting mechanism may be utilized for removing the upper portions of other vehicles, there is provided a trackway 59 in which are engaged the rollers or wheels 61 of the suspension rods 62. These rods carry hooks 63 at their lower ends which may be engaged under the lower edges of a raised upper body portion so that upon lowering of the hoisting cables, the entire upper body may be suspended from the rods 62 and may be moved along the trackway to another locality. When it is desired to reposition an upper deck upon a vehicle the upper portion is arranged approximately in alinement with the lower and the hoisting cables are then engaged with the bars 23 and the upper body portion lifted clear of the rods 62. It is then lowered upon the lower body portion and guided by the operator until the ribs 33 and 38 are caused to interfit with their complementary members and the latches 18 move to locking position. Because of the automatic feature of the locking devices I have eliminated the necessity of first manually unlocking the upper and lower body portions before removing the upper portion. The hoisting mechanism is also quick acting so that the entire operation of removing or attaching an upper body portion will require a minimum of time.

By using a convertible vehicle body portion such as described above a transportation company may meet peak load conditions or emergencies without the necessity of having an additional number of complete vehicles which may remain idle the greater portion of the day. A number of upper decks together with their necessary hoisting equipment may be provided at a fraction of the cost of one additional complete vehicle. Furthermore, when the traffic is light such vehicles will not operate uneconomically since the upper deck is then removed and no surplus weight is being carried.

I claim:

1. In a device of the class described, a vehicle body adapted to receive passengers and having a roof, an upper passenger deck adapted to be positioned upon said roof, means for maintaining said upper deck in alinement with the body comprising members interlocking said upper deck and said body roof, and latch means automatically engageable when the upper deck is positioned upon the body for locking said deck and body together.

2. In a device of the class described, a vehicle body adapted to receive passengers and having a roof, an upper passenger deck adapted to be removably positioned upon said roof, means for retaining said deck in alinement with the body comprising transverse and longitudinal rails on the roof of the body, said upper deck having grooves adapted to receive said rails, and latch means for locking said deck to said body, said locking means including a movable bar to which a hoist may be attached, and a latch member actuated by upward movement of said bar to disengage locking engagement between the deck and body.

3. A motor vehicle having a lower deck for passengers, a removable upper deck also for passengers, a passageway between said upper and lower decks, a movable door for closing said passageway, and means actuated by lowering of the upper deck upon the lower for opening said door.

In testimony whereof, I have hereunto set my hand.

ALEXANDER W. BROHMAN.